United States Patent
Amin Kamali et al.

(10) Patent No.: US 12,287,788 B2
(45) Date of Patent: Apr. 29, 2025

(54) LEARNED JOIN CARDINALITY ESTIMATION USING A JOIN GRAPH REPRESENTATION

(71) Applicant: International Business Machines Corporation, Armonk, NY (US)

(72) Inventors: Seyed Mohammad Amin Kamali, Orleans (CA); Vincent Corvinelli, Mississauga (CA); Calisto Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 18/339,284

(22) Filed: Jun. 22, 2023

(65) Prior Publication Data

US 2024/0427768 A1   Dec. 26, 2024

(51) Int. Cl.
G06F 7/00        (2006.01)
G06F 16/2453     (2019.01)
G06F 16/2455     (2019.01)

(52) U.S. Cl.
CPC .... *G06F 16/24544* (2019.01); *G06F 16/2456* (2019.01)

(58) Field of Classification Search
CPC ........... G06F 16/24544; G06F 16/2456; G06F 16/93; G06F 16/24575; G06F 16/9027; G06F 16/435; G06F 16/254; G06F 16/951; G06F 16/906; G06N 20/10; G06N 5/02
See application file for complete search history.

(56) References Cited

U.S. PATENT DOCUMENTS

| 10,565,286 B2 | 2/2020 | Nica et al. |
| 10,643,132 B2 | 5/2020 | Corvinelli et al. |
| 10,942,923 B1 | 3/2021 | Zhang et al. |
| 11,030,521 B2 | 6/2021 | Corvinelli et al. |

(Continued)

FOREIGN PATENT DOCUMENTS

WO       2022043798 A1    3/2022

OTHER PUBLICATIONS

Chen et al "Join cardinality estimation by combining operator-level deep neural networks." Information Sciences 546, 2021, pp. 1047-1062.

(Continued)

*Primary Examiner* — Mohammad A Sana
(74) *Attorney, Agent, or Firm* — CANTOR COLBURN LLP; Teddi Maranzano

(57) ABSTRACT

Aspects of the invention include techniques for providing a learned join cardinality estimation using a join graph representation. A non-limiting example method includes building a join cardinality estimation model. The model can be built by generating a training query having a known join cardinality, generating an adjacency matrix encoding a join graph of the training query, encoding one side of a diagonal axis of the adjacency matrix, and training the join cardinality estimation model using the encoded adjacency matrix and the known join cardinality. The method includes performing an inference using the join cardinality estimation model. The inference includes a predicted join cardinality for a query. The method includes executing a query execution plan for the query using the predicted join cardinality.

22 Claims, 12 Drawing Sheets

(56) References Cited

U.S. PATENT DOCUMENTS

| | | | |
|---|---|---|---|
| 11,625,398 B1* | 4/2023 | Bhuyan | G06F 16/24544 707/714 |
| 11,921,719 B1* | 3/2024 | Alhamid | G06F 16/24544 |
| 12,001,546 B2* | 6/2024 | Yang | G06F 21/55 |
| 2009/0177623 A1 | 7/2009 | Krishna | |
| 2017/0023657 A1* | 1/2017 | Tomoda | G01R 33/543 |
| 2019/0303475 A1 | 10/2019 | Jindal et al. | |
| 2021/0056108 A1 | 2/2021 | Shmueli et al. | |
| 2022/0067045 A1 | 3/2022 | Kalil et al. | |

OTHER PUBLICATIONS

Chen et al., "LOGER: A Learned Optimizer Towards Generating Efficient and Robust Query Execution Plans." Proceedings of the VLDB Endowment 16.7, 2023, pp. 1777-1789.

Davitkova et al., "LMKG: Learned Models for Cardinality Estimation in Knowledge Graphs." arXiv preprint arXiv:2102.10588, 2021, 12 pages.

Ivanov et al., "Adaptive cardinality estimation." arXiv preprint arXiv:1711.08330 (2017), 7 pages.

Kipf et al., "Learned cardinalities: Estimating correlated joins with deep learning," arXiv preprint arXiv:1809.00677. 2018, 8 pages.

Marcus et al., "Neo: A learned query optimizer." arXiv preprint arXiv:1904.03711. 2019, 18 pages.

Negi et al. "Flow-loss: Learning cardinality estimates that matter." arXiv preprint arXiv:2101.04964. 2021, 17 pages.

Ortiz et al., "An Empirical Analysis of Deep Learning for Cardinality Estimation," arXiv preprint arXiv:1905.06425, 2019, 17 pages.

Praciano et al. "Robust Cardinality: a novel approach for cardinality prediction in SQL queries." Journal of the Brazilian Computer Society vol. 27, Iss. 1, 2021, pp. 1-24.

Woltmann et al., "Cardinality estimation with local deep learning models." Proceedings of the second international workshop on exploiting artificial intelligence techniques for data management, aiDM@SIGMOD 2019: 5:1-5:8, 2019, 8 pages.

Yang et al., "Selectivity Estimation with Deep Likelihood Models", arXiv preprint arXiv:1905.04278, 2019, 14 pages.

International Search Report; International Application No. PCT/EP2024/063590; International Filing Date: May 16, 2024; Date of mailing: Sep. 4, 2024; 10 pages.

Zhu Daobing et al. "Gace: Graph-attention-network-based cardinality estimator." International Conference on Database and Expert Systems Applications. Cham: Springer International Publishing, (2021): pp. 332-345.

* cited by examiner $$SK = \begin{matrix} T1 \\ T2 \\ T3 \\ T4 \\ T5 \end{matrix} \begin{bmatrix} (0,0) & (0.004,0.004) & (0.004,0.043) & (0.004,0.011) & (0,0) \\ (0.004,0.004) & (0,0) & (0,0) & (0,0) & (0,0) \\ (0.043,0.004) & (0,0) & (0,0) & (0,0) & (0.042,0.006) \\ (0.011,0.004) & (0,0) & (0,0) & (0,0) & (0,0) \\ (0,0) & (0,0) & (0.006,0.043) & (0,0) & (0,0) \end{bmatrix}$$

800 ↗

$$\underbrace{\begin{bmatrix} 0.004 & 0.004 & 0.043 & 0.004 & 0.004 & 0 & 0 & 0 & 0 & 0 & 0.043 & 0 & 0 & 0 & 0.006 & 0.011 & 0 & 0 & 0 & 0 & 0.004 & 0 & 0.043 & 0 & 0 \end{bmatrix}}_{(n \times n \times 2)}$$

LEARNED JOIN CARDINALITY ESTIMATION USING A JOIN GRAPH REPRESENTATION

BACKGROUND

The present invention generally relates to database design, and more specifically, to computer systems, computer-implemented methods, and computer program products for providing a learned join cardinality estimation using a join graph representation.

A relational database management system (RDBMS) often relies on structured query language (SQL) to manage data stored in a relational database. An RDBMS may typically include single column statistics that are usually collected on individual columns in a so-called relation. A relation may include tuples and/or attributes that describe the relationship(s) and/or the defining feature(s) in a table or between tables in a relational database. For example, a relation can include data values on a table and the relational database may store the data values as relations or tables. A collection of relations or tables may be stored on a database as a relational model.

Queries can be executed against a relational database using an RDBMS. A query refers to a specific request or command issued to the RDBMS to retrieve, manipulate, and/or update data stored in a relational database. Queries allow users to interact with the database and to perform various operations such as retrieving specific records, filtering data based on certain criteria, aggregating information, joining tables, and modifying data. Queries are typically written using SQL, which provides a standardized syntax and set of commands to interact, via queries, with the database.

Cardinality estimation refers to the process of estimating the number of rows that will be returned by a query operation and is an essential aspect of query optimization, index selection, resource allocation, and execution planning in an RDBMS. When a query is executed, a database or query optimizer (e.g., a component of the RDBMS) analyzes the query and determines the most efficient execution plan. To do this, the optimizer needs to estimate the cardinality of the intermediate and final results of the query. The optimizer uses statistical information, such as column histograms, single column statistics, and multi-column correlations, to make these estimations.

The cardinality of a specific column or a set of columns represents the number of unique values of the specific column or the set of columns. For example, in a customer table, the cardinality of the "customer_id" column represents the number of unique customers in the table. In contrast, the cardinality of a query result set indicates the number of distinct rows or tuples that will be returned.

In the context of query optimization, the join cardinality estimation problem refers to the challenge of accurately estimating the number of rows that will result from joining two or more tables in a database query. Join cardinality estimation is crucial for the optimizer to generate an efficient query execution plan. The optimizer uses join cardinality estimates to evaluate different access paths, join algorithms, and plan alternatives to choose the most efficient execution strategy. Accurate join cardinality estimations help the optimizer more accurately estimate the cost of different plan options, such as the number of disk I/O operations, CPU utilization, and memory requirements.

An ideal join cardinality estimation method satisfies several properties: it is effective at generating high-quality query plans, efficient in that it minimizes estimation latency, generalizable to new queries, and easy to deploy in that it has a relatively small model size, fast training times, and the ability to scale with the number of tables. Unfortunately, estimating join cardinality accurately is challenging due to several factors, such as unknown or changing data distributions, unknown correlations between joining columns, and filters/predicates in the query.

Existing join cardinality estimation techniques approach solving the join cardinality estimation problem using one or both of two general categories: classical and learning. Neither classical nor previous learning-based methods yield satisfactory accuracy when estimating the cardinality of join queries. These techniques often rely on simplified assumptions leading to ineffective cardinality estimates or require building and training large models to understand the data distributions, data correlations, etc., leading to long planning times and a lack of generalizability across queries.

SUMMARY

Embodiments of the present invention are directed to techniques for providing a learned join cardinality estimation using a join graph representation. A non-limiting example method includes building a join cardinality estimation model. The model can be built by generating a training query having a known join cardinality, generating an adjacency matrix encoding a join graph of the training query, encoding one side of a diagonal axis of the adjacency matrix, and training the join cardinality estimation model using the encoded adjacency matrix and the known join cardinality. The method includes performing an inference using the join cardinality estimation model. The inference includes a predicted join cardinality for a query. The method includes executing a query execution plan for the query using the predicted join cardinality. Advantageously, leveraging a join cardinality estimation model in this manner enables an encoding mechanism that demonstrates strong generalization capabilities. By using abstract statistical information about the tables, local predicates, and the joins of a query, the structure of the join graph is used rather than its specific elements. Therefore, for new queries, join cardinality can be inferred based on the similarity of the join graph and the abstract information about the tables and the predicates involved.

In some embodiments, performing the inference includes generating an adjacency matrix encoding a join graph of the query, encoding one side of a diagonal axis of the adjacency matrix, inputting the encoded adjacency matrix into the join cardinality estimation model, and receiving, as output, the predicted join cardinality. Advantageously, this configuration provides an efficient join cardinality estimation for each respective query, as the model can be pre-trained offline.

In some embodiments, training the join cardinality estimation model includes adjusting one or more weights of the join cardinality estimation model until an output predicted join cardinality for the training query matches the known join cardinality within a predetermined threshold. Advantageously, training the join cardinality estimation model in this manner provides for relatively fast convergence (agreement to known test inputs).

In some embodiments, for a given query that joins a set of n tables, the respective adjacency matrix can be defined as an n×n matrix, where a value in the matrix at a position (i, j) is 1 if the table i is joined with table j and 0 otherwise. Advantageously, this configuration allows for the structure of a given query to be encoded in a manner that can be readily provided to a model (e.g., the join cardinality estimation model).

In some embodiments, building the join cardinality estimation model further includes generating an additional adjacency matrix encoding a join type of the training query, encoding one side of a diagonal axis of the additional adjacency matrix into a join type adjacency matrix, and concatenating the encoded join type adjacency matrix with the encoded join graph prior to training the join cardinality estimation model. Advantageously, this technique allows for the matrix encoding to account for join type data in a query.

In some embodiments, building the join cardinality estimation model further includes generating an additional adjacency matrix encoding a join operator of the training query, encoding one side of a diagonal axis of the additional adjacency matrix, and concatenating the join operator encoded adjacency matrix with the encoded join graph prior to training the join cardinality estimation model. Advantageously, this technique allows for the matrix encoding to account for join operator data in a query.

In some embodiments, building the join cardinality estimation model further includes generating an additional adjacency matrix encoding a ratio of the cardinality of join columns to table cardinality on each side of a join of the training query, encoding one side of a diagonal axis of the additional adjacency matrix into a column-to-table encoded adjacency matrix, and concatenating the column-to-table encoded adjacency matrix with the encoded join graph prior to training the join cardinality estimation model. Advantageously, this technique allows for the matrix encoding to account for the ratio of column cardinality to table cardinality in a query.

In some embodiments, building the join cardinality estimation model further includes generating an additional adjacency matrix encoding a ratio of the cardinality of left and right tables of a join of the training query, encoding one side of a diagonal axis of the additional adjacency matrix into a tables cardinality encoded adjacency matrix, and concatenating the table cardinalities encoded adjacency matrix with the encoded join graph prior to training the join cardinality estimation model. Advantageously, this technique allows for the matrix encoding to account for the ratio of table cardinalities in a query.

In some embodiments, building the join cardinality estimation model further includes generating an additional adjacency matrix encoding a measure of skewness for each join column of a join of the training query, encoding one side of a diagonal axis of the additional adjacency matrix into an encoded skewness adjacency matrix, and concatenating the encoded skewness adjacency matrix with the encoded join graph prior to training the join cardinality estimation model. Advantageously, this technique allows for the matrix encoding to account for the skewness of a join in a query.

In some embodiments, building the join cardinality estimation model further includes generating an additional adjacency matrix encoding a measure of join predicate selectivity of a join of the training query, encoding one side of a diagonal axis of the additional adjacency matrix into an encoded join factor adjacency matrix, and concatenating the encoded join factor adjacency matrix with the encoded join graph prior to training the join cardinality estimation model. Advantageously, this technique allows for the matrix encoding to account for the join selectivity without local predicates and provides an indication of whether the number of rows will expand, reduce or remain the same relative to the cartesian product of the rows in the two tables.

In some embodiments, building the join cardinality estimation model further includes generating an additional adjacency matrix encoding whether one side of a join column values is a superset of the other side of the join column values of the training query, encoding one side of a diagonal axis of the additional adjacency matrix into an encoded inclusion factor adjacency matrix, and concatenating the encoded inclusion factor adjacency matrix with the encoded join graph prior to training the join cardinality estimation model. Advantageously, this technique allows for the matrix encoding to account for the inclusion factors of a join in a query.

In some embodiments, building the join cardinality estimation model further includes generating an additional adjacency matrix encoding a cardinality of respective base tables and a selectivity of local predicates on the base tables of a join of the training query, encoding one side of a diagonal axis of the additional adjacency matrix into an encoded node configuration adjacency matrix, and concatenating the encoded node coordinates adjacency matrix with the encoded join graph prior to training the join cardinality estimation model. Advantageously, this technique allows for the matrix encoding to account for the other characteristics of a query that are properties of the tables rather than the joins.

Embodiments of the present invention are directed to techniques for providing a learned join cardinality estimation using a join graph representation. A non-limiting example method includes generating a training query having a known join cardinality, generating an adjacency matrix encoding a join graph of the training query, encoding one side of a diagonal axis of the adjacency matrix, and training the join cardinality estimation model using the encoded join graph and the known join cardinality. Advantageously, training a join cardinality estimation model in this manner enables an efficient join cardinality estimation mechanism that demonstrates strong generalization capabilities.

Embodiments of the present invention are directed to techniques for providing a learned join cardinality estimation using a join graph representation. A non-limiting example method includes performing an inference using a trained join cardinality estimation model. The inference includes a predicted join cardinality for a query. Performing the inference includes generating an adjacency matrix encoding a join graph of the query, encoding one side of a diagonal axis of the adjacency matrix into an encoded adjacency matrix, inputting the encoded adjacency matrix into the join cardinality estimation model, and receiving, as output, the predicted join cardinality. The method includes executing a query execution plan for the query using the predicted join cardinality. Advantageously, leveraging a trained model for join cardinality estimation in this manner enables an efficient join cardinality estimation mechanism that demonstrates strong generalization capabilities.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 8 depicts an example table of the skewness factor on join columns encoded in accordance with one or more embodiments;

Figure 1:
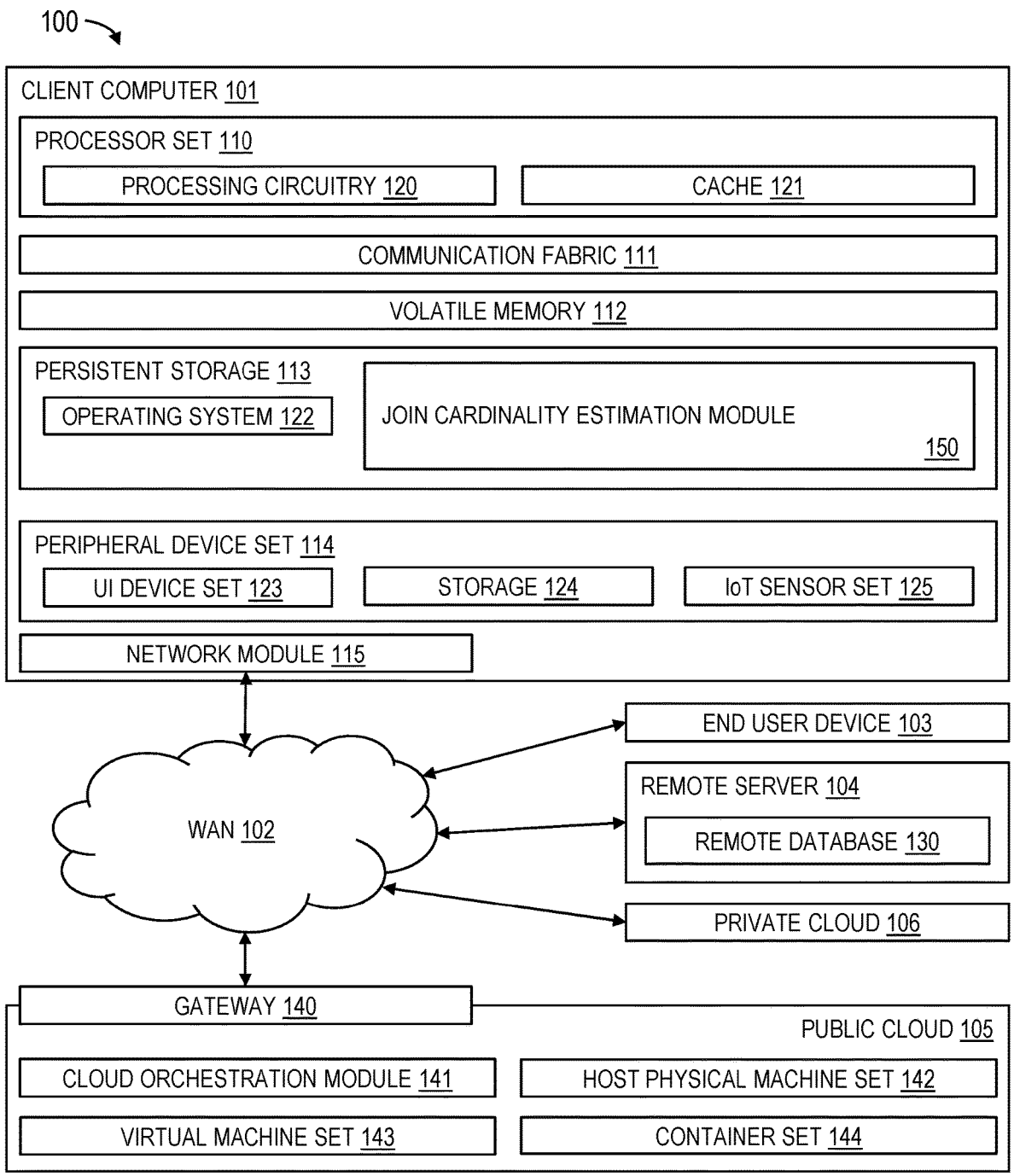
FIG. 1 depicts a block diagram of an example computing environment for use in conjunction with one or more embodiments.

The diagrams depicted herein are illustrative. There can be many variations to the diagram or the operations described therein without departing from the spirit of the invention. For instance, the actions can be performed in a differing order or actions can be added, deleted or modified.

In the accompanying figures and following detailed description of the described embodiments of the invention, the various elements illustrated in the figures are provided with two or three-digit reference numbers. With minor exceptions, the leftmost digit(s) of each reference number correspond to the figure in which its element is first illustrated.

DETAILED DESCRIPTION

Estimating join cardinality accurately is challenging due to several factors, such as unknown or changing data distributions, unknown correlations between joining columns, and filters/predicates in the query. For example, a database or query optimizer needs to make assumptions about the distribution of data within the tables involved in a join. However, the actual data distribution might not be known in advance or can change over time. Skewed data distributions, where a few values are much more common than others, can significantly impact the cardinality estimates. The optimizer must also account for the degree, if any, of correlation between the multiple joining columns. If the values in the joining columns are highly correlated, the cardinality of the join result will be different than estimated from a simple multiplication of the individual table selectivity of the individual join predicates. Determining this correlation accurately is challenging, especially when there are no explicit foreign key relationships defined.

Other challenges include the presence of filters (predicates) in the query, which add another layer of complexity to cardinality estimation. The optimizer needs to estimate the selectivity of each predicate accurately to predict the number of rows that will qualify for the join. If the selectivity is underestimated, the optimizer might choose an inefficient plan that results in excessive intermediate results. In addition, different join algorithms, such as nested loop join, hash join, and merge join, have different behaviors depending on the input table's cardinality and the resulting cardinality after applying the join predicates. An optimizer needs to estimate the join cardinality accurately to determine which join algorithm to choose.

To address the join cardinality estimation problem, database systems employ various techniques. For example, histograms provide a statistical summary of data distribution within a column. By analyzing the histogram, the optimizer can make better estimates about the number of distinct values and the frequency of each value, aiding in cardinality estimation. Other techniques include sampling, which involves examining a subset of data to estimate the characteristics of the entire dataset. By analyzing a representative sample, the optimizer can infer the distribution and correlation of the data, leading to more accurate cardinality estimates. Optimizers can also use cost models to assign costs to different query plans based on the estimated cardinalities. In these configurations, the optimizer explores different join orders and algorithms, assigns costs to each plan, and selects the one with the lowest cost. Iterative algorithms like dynamic programming and genetic algorithms are commonly used to search the plan space efficiently. Database systems can maintain statistics about tables, including column histograms, to aid in cardinality estimation. These statistics are collected periodically or on-demand based on observed data patterns and correlations, providing valuable information about the data distribution and correlation.

As described previously, existing join cardinality estimation techniques approach solving the join cardinality estimation problem using one or both of two general categories: classical and learning. Neither classical nor previous learning-based methods yield satisfactory accuracy when estimating the cardinality of join queries. These techniques often rely on simplified assumptions leading to ineffective cardinality estimates or require building and training large models to understand the data distributions, data correlations, etc., leading to long planning times and a lack of generalizability across queries.

This disclosure introduces new methods, computing systems, and computer program products for providing a learned join cardinality estimation using a join graph representation. Join graph representations are built from two constructs: the adjacency matrix and node coordinates. The adjacency matrix of the join graph is used as a building block to encode information about the joins. Other characteristics of the query that are properties of the tables rather than the joins, such as cardinality of the base tables as well as the selectivity of local predicates on the base tables, are encoded as the node coordinates. In some embodiments, training queries are encoded into vectors that can be consumed by a machine learning model.

A join cardinality estimation architecture that leverages a join graph representation in accordance with one or more embodiments described herein offers various technical advantages over prior approaches to join cardinality estimation. Notably, each of the join graph features captured in accordance with one or more embodiments serves an important role in allowing the underlying model to estimate the join cardinality. The join cardinality estimation architecture described herein is not limited to queries of certain types of operators or join types and can generalize to any join graphs. Moreover, the skewness of the predicate columns is captured using skewness coefficients.

Other advantages are possible. Unlike prior approaches, the join cardinality estimation architecture described herein accounts for scenarios where the set of column values on one side of a join is not a subset of the column values on the other side. By explicitly capturing pairwise correlations, the model can take such correlations into account while computing the composite selectivity from the local predicates.

Advantageously, the presented join cardinality estimation architecture leverages an encoding mechanism that demonstrates strong generalization capabilities. By using abstract statistical information about the tables, local predicates, and the joins, the structure of the join graph is used rather than its specific elements. Therefore, for new queries, join cardinality can be inferred based on the similarity of the join graph and the abstract information about the tables and the predicates involved.

Other approaches often require collecting join samples as input to their respective models. Collecting these samples and computing the join is very expensive and not feasible in a production environment. The present solution does not require any samples as input to the model to compute a join cardinality estimate, and is therefore relatively more efficient, resulting in negligible overhead on query optimization times when integrating the model usage in a query optimizer.

In some embodiments, the join cardinality estimation architecture described herein includes continuous learning through runtime feedback. Continuous learning through runtime feedback results in automatically improving (adapting) the model over time in view of runtime changes in schema, data and workloads. Prior approaches must capture all the tables and columns in a database, requiring re-building and re-training the respective model from scratch to account for any changes in the schema. This schema change induced retraining is very expensive and the model is relegated for use with static databases. While some approaches make use of join samples to help account for potential changes in the data over time, it is very expensive to account for these every time a query is compiled as compared to the runtime feedback approach described herein, which, again, will continuously train over time in the background with minimal impact.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as join cardinality estimation module 150 (also referred to herein as block 150). In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

It is to be understood that the block diagram of FIG. 1 is not intended to indicate that the computing environment 100 is to include all of the components shown in FIG. 1. Rather, the computing environment 100 can include any appropriate fewer or additional components not illustrated in FIG. 1 (e.g., additional memory components, embedded controllers, modules, additional network interfaces, etc.). Further, the embodiments described herein with respect to the computing environment 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
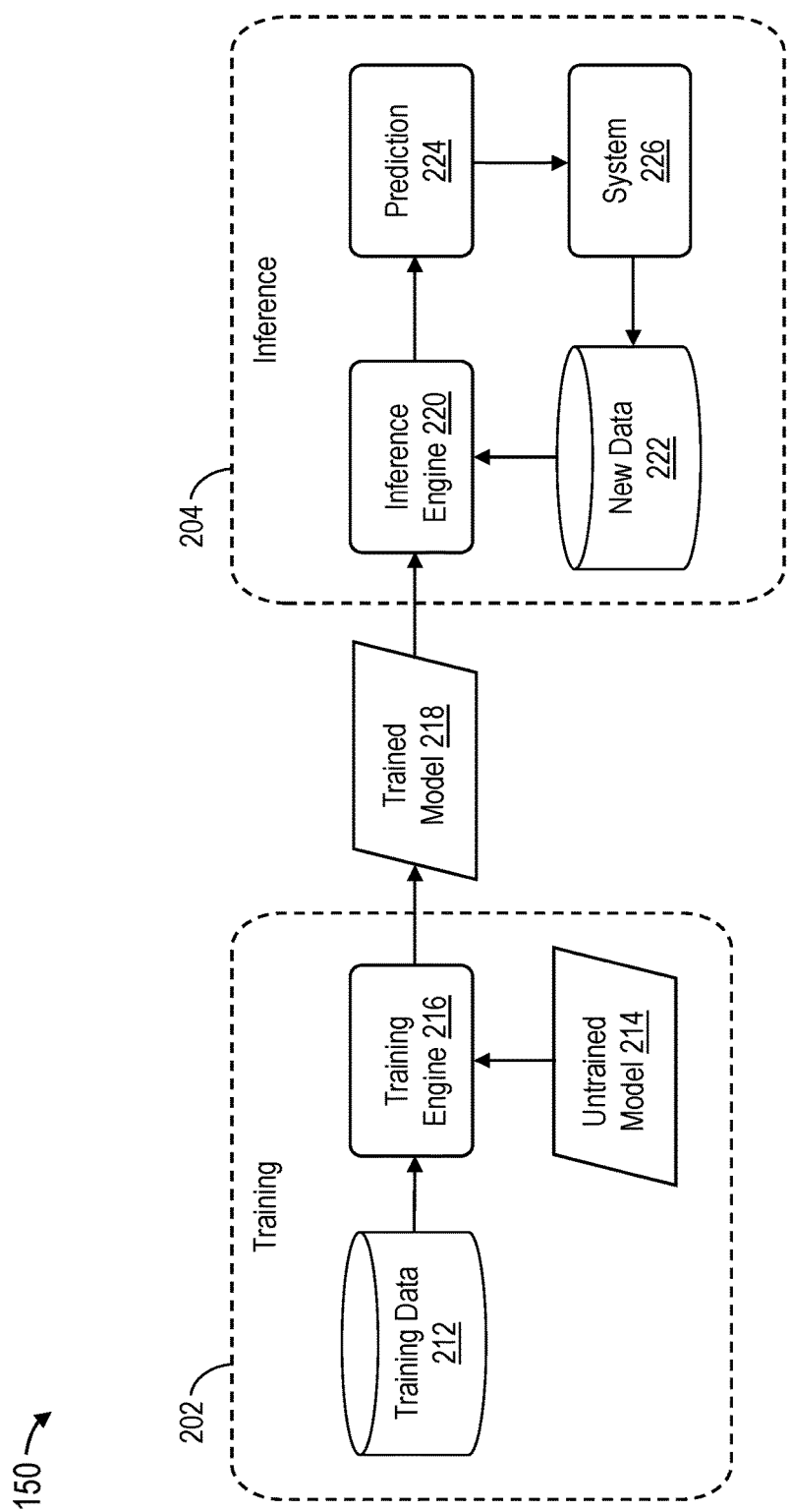
FIG. 2 depicts a block diagram of a system for training and using a machine learning model for join cardinality estimation based on join graph representations in accordance with one or more embodiments.

In some embodiments, the join cardinality estimation module 150 includes a model that is trained for join cardinality estimation based on join graph representations. Systems for training and using a machine learning model for join cardinality estimation based on join graph representations is now described with reference to FIG. 2. Particularly, FIG. 2 depicts a block diagram of components of a machine learning training and inference system (e.g., the join cardinality estimation module 150) according to one or more embodiments described herein.

In some embodiments, the join cardinality estimation module 150 performs training 202 and inference 204. During training 202, a training engine 216 trains a model (e.g., the trained model 218) to perform a task, such as to estimate join cardinality for a query using join graph representations. Inference 204 is the process of implementing the trained model 218 to perform the task, such as to estimate join cardinality for a query made in the context of a larger system 226 (e.g., the computing environment 100 of FIG. 1).

Training 202 begins with training data 212, which may be structured or unstructured data. According to one or more embodiments described herein, the training data 212 includes queries from a query workload. The training engine 216 receives the training data 212 and an untrained model 214. The untrained model 214 represents a base model that is untrained (i.e., prior to training). The untrained model 214 can have preset weights and biases, which can be adjusted during training. It should be appreciated that the untrained model 214 can be selected from many different model forms such as, for example, fully connected neural networks, graph neural networks, gradient boosted trees, etc.

Training 202 can include supervised learning, semi-supervised learning, unsupervised learning, reinforcement learning, and/or the like, including combinations and/or multiples thereof. For example, supervised learning can be used to train a machine learning model from training data having associated labels (i.e., a known ground truth) and other data that does not include the associated labels. In this example, the training engine 216 takes as input a training query from the training data 212, makes a join cardinality prediction, and compares the prediction to the known label (i.e., the known join cardinality). The algorithm associated with the model being trained then adjusts weights and/or biases of the model based on results of the comparison, such as by using backpropagation. The training 202 may be performed multiple times (referred to as "epochs") until a suitable model is trained (e.g., the trained model 218).

Once trained, the trained model 218 can be used to perform inference 204 to perform a task, such as to estimate join cardinality as described previously. The inference engine 220 applies the trained model 218 to new data 222 (e.g., real-world, non-training data). For example, the new data 222 can be a query made during runtime. In short, the new data 222 represents data to which the trained model 218 has not been exposed.

The inference engine 220 makes a prediction 224 (e.g., a join cardinality estimation) and passes the prediction 224 to the system 226 (e.g., the computing environment 100 of FIG. 1). The system 226 can, based on the prediction 224, take an action leveraging the prediction. These actions can include, for example, generate and/or executing an efficient query execution plan using the predicted join cardinality (e.g., for a database or query optimizer). In some embodiments, the system 226 can add to and/or modify the new data 222 based on the prediction 224.

In accordance with one or more embodiments, the prediction 224 generated by the inference engine 220 is periodically monitored and verified to ensure that the inference engine 220 is operating as expected. Based on the verification, additional training 202 may occur using the trained model 218 as the starting point. The additional training 202 may include all or a subset of the original training data 212 and/or new training data 212. In accordance with one or more embodiments, the training 202 includes updating the trained model 218 to account for changes in expected input data.

Generating and Labeling Training Queries

In some embodiments, the training data 212 can be progressively generated from a database workload. In some embodiments, before any workload traces are collected, the join cardinality estimation module 150 can generate one or more synthetic queries (i.e., training data 212) against the database. These queries include a mix of patterns that are typically used in production environments. These patterns may be characterized by the number of joins, number of join and local predicates, join types (e.g. inner-join, outer-join, anti-join), join and local predicate operators (e.g. <, >, >=, <=, =), and the methods used to discover joins. In some embodiments, the joins may be discovered primarily based on the referential integrity constraints that determine the relationship between the respective fact tables and dimension tables. If the joins discovered by this method are insufficient, the join cardinality estimation module 150 can use other approaches, including but not limited to, data mining, schema relationship (e.g. ontology), column name similarities, value similarities, and actual query workload mining to discover additional joins and patterns for training. In some embodiments, the patterns that are used for query generation can be controlled and fine-tuned based on empirical data (e.g., past experience about the characteristics of the historical database workloads).

Encoding Queries Using Join Graph Representation

Once the training queries are generated, the queries can be encoded into vectors that can be consumed by a machine learning model (e.g., the trained model 218 via the training engine 216). In some embodiments, these vectors are constructed by using two constructs related to a query join graph: Adjacency Matrix and Node Coordinates. A query may have multiple query blocks that are separated by a non-join operator, for example, a UNION or an aggregation (GROUP BY) operator. In some embodiments, the joins within each query block are encoded separately if they cannot be merged into a single join query block.

Join Characteristics Encoded as Edges of the Adjacency Matrix

In some embodiments, the adjacency matrix of the join graph is used as a building block to encode information about the joins. For a given query that joins a set of n tables, the adjacency matrix can be defined as an n×n matrix $AM_{n \times n}$ where:

$$AM_{ij} = \begin{cases} 1, & \text{if table } i \text{ is joined with table } j \\ 0, & \text{Otherwise} \end{cases}$$

Figures 3A, 3B:
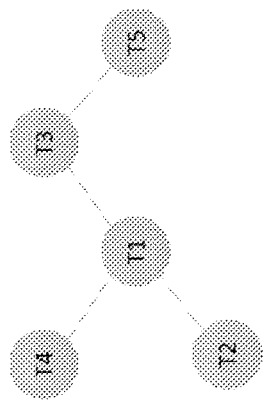
FIG. 3A depicts an example join graph in accordance with one or more embodiments.
FIG. 3B depicts an example adjacency matrix for the join graph of FIG. 3A in accordance with one or more embodiments.

As an example, consider a query with the example join graph 300 illustrated in FIG. 3A, where $T_N$ represents the different tables involved in a join. An example adjacency matrix 350 of the join graph 300 can be defined as shown in FIG. 3B.

Figure 4:
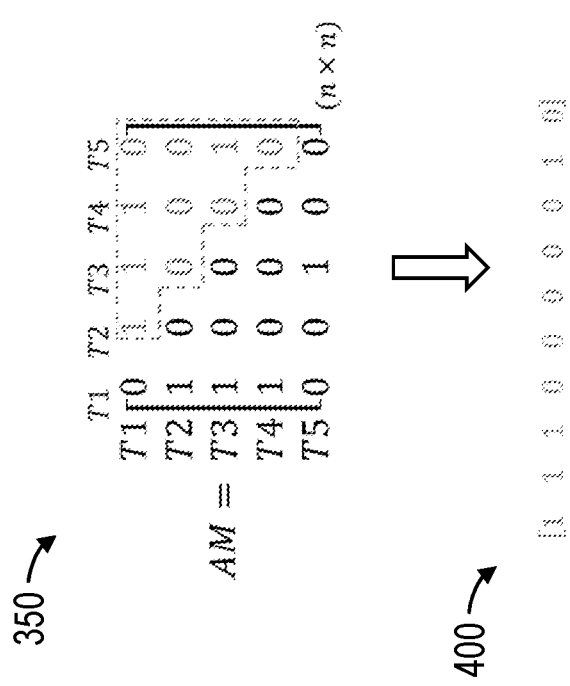
FIG. 4 depicts an example encoding of an adjacency matrix into a one-dimensional vector in accordance with one or more embodiments.

In some embodiments, the adjacency matrix (refer FIG. 3B) is symmetric given that the join graph is undirected. Observe that one side of the diagonal axis carries as much information as the entire matrix. Some models, such as a fully connected neural network model, take input in the form of a one-dimensional vector. In this case, the adjacency matrix can be condensed into a one-dimensional vector representing one side of the diagonal axis as illustrated in FIG. 4. Observe that an n×n matrix will be condensed in this manner into a vector of size [n(n−1)]/2. Conversely, for a graph neural network model, the input does not have to be expressed as a one-dimensional vector, allowing the matrix structure to be preserved. All such configurations are within the contemplated scope of this disclosure.

In some embodiments, in case of self-joins, a separate placeholder can used for the second instance of the table. For example, when the query is a single self-join over a table, the query can be encoded using a two-by-two adjacency matrix where each instance of the table occupies one of the two positions. In some embodiments, this general schema is then used to encode different pieces of information about each join that are essential for a model to learn the result cardinality, as discussed in greater detail herein.

Join Types (JT)

Figure 5:
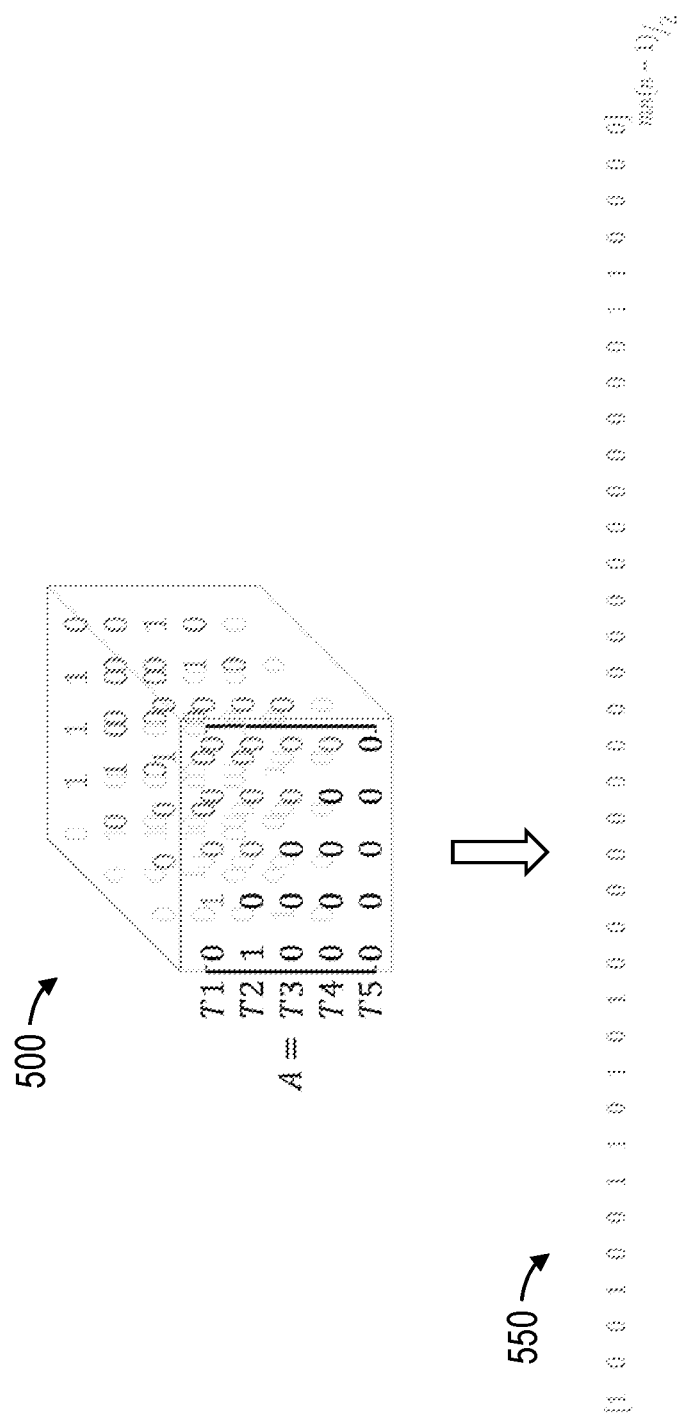
FIG. 5 depicts an example three-dimensional matrix and its resultant one-dimensional vector in accordance with one or more embodiments.

In some embodiments, join types (such as inner-join, outer-join, and anti-join) are represented using array in place of each element of the adjacency matrix, resulting in a three-dimensional matrix $JT_{n \times n \times m}$, where n is the number of tables involved and m is the number of join types supported by the model plus one. In other words, each position of a n×n matrix (built as discussed previously) can be populated with an array of size m defining a one-hot encoding of the join type, extended by an additional element representing the order of the joins (the "plus one"). Note that this last element is necessary since the relative ordering of inner-joins with respect to outer-joins or anti-joins may impact the cardinality of the outer-joins or anti-joins. As such, this may be indicated by an ordinal encoding in the last position of the array corresponding to that join. For example, consider a scenario having the following join characteristics: (T1 inner-join T2 ON T1·C1=T2·C1) left outer-join (T3 anti-join T4 ON T3·C2=T4·C2) ON T1·C3=T3·C3. T1 join T2 may be encoded with (1, 0, 0, 1), T3 anti-join T4 may be encoded with (0, 0, 1, 2), and the left outer-join can be encoded with (0, 1, 0, 3). In some embodiments, this three-dimensional matrix is then condensed into a one-dimensional vector of size [mn(n−1)]/2, for example, if using a model that requires a one-dimensional vector representing one side of the diagonal axis, as discussed previously. An example three-dimensional matrix 500 and its resultant one-dimensional vector 550 are depicted in FIG. 5.

Join Operators (JO)

In some embodiments, each join in the query may involve one or more join predicates that associate different columns on the two sides of the join. Each join predicate associates a pair of columns using an operator (e.g., <, >, <=, >=, =, LIKE, IN). In some embodiments, the operators are represented by bit vectors. Assuming the model (e.g., trained model 218) supports 7 operators, the corresponding encoding will be a bit vector of size 7, where a value of 1 in each position corresponds to the presence of a certain operator in the join. For example, a join with a '<' operator can be represented by [1 0 0 0 0 0 0]. Joins with more than one join operator can also be encoded in the same manner. For example, a join with '<' and '=' operators, can be represented by [1 0 0 0 1 0 0]. Similar to the join types, these bit vectors are stacked in a three-dimensional adjacency matrix $JO_{n \times n \times k}$ where k is the number of supported operators. This matrix can be condensed into a one-dimensional vector of size [kn(n−1)]/2, if using a model that requires a one-dimensional vector, as discussed previously.

Ratio of Join Column(s) Cardinality to Table Cardinality (CC)

The ratio of the cardinality of the join column(s) to the table cardinality on each side of the join provides a signal about the uniqueness of the join column(s). This value ranges between zero and one, where values closer to zero indicate few distinct values in the join column, while values closer to one indicate unique or near unique join columns. This is a contributing factor to the resulted cardinality. Therefore, in some embodiments, this information is computed and collected at compile time and included in the encoding.

Figure 6:
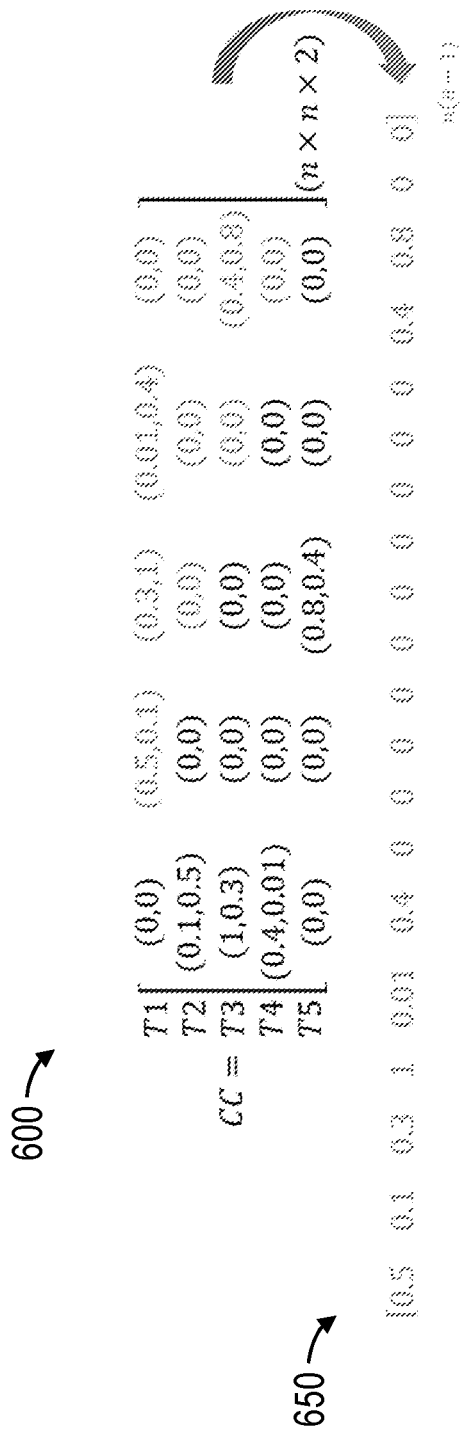
FIG. 6 depicts an example table of the ratio of column cardinality to table cardinality for join columns encoded in accordance with one or more embodiments.

In one embodiment, the computation is performed based on the statistics that are available for different tables and columns: table cardinality, column cardinality (COLCARD), and column group cardinality (COMBINED_COLCARD). If a certain join includes more than one join predicate, where at least on one side of the join more than one column is involved, then the COMBINED_COLCARD of those columns is used in the numerator. Otherwise, the column cardinality of the single column involved is used. The cardinality ratio can also be computed using other methods, including but not limited to, on-the-fly sampling, a learned model (e.g., the trained model 218 and/or another model), or other statistics such as multi-column histograms. In some embodiments, once calculated, the ratios on both sides of the joins are encoded using a three-dimensional adjacency matrix $CC_{n \times n \times 2}$ which is then condensed into a one-dimensional vector of size n(n−1) as described previously. FIG. 6 depicts an example table 600 of the ratio of column cardinality to table cardinality for join columns $(T_i \cdot A, T_j \cdot A)$ encoded using the adjacency matrix and the resultant one-dimensional vector 650.

Ratio of Table Cardinalities (RC)

Figure 7:
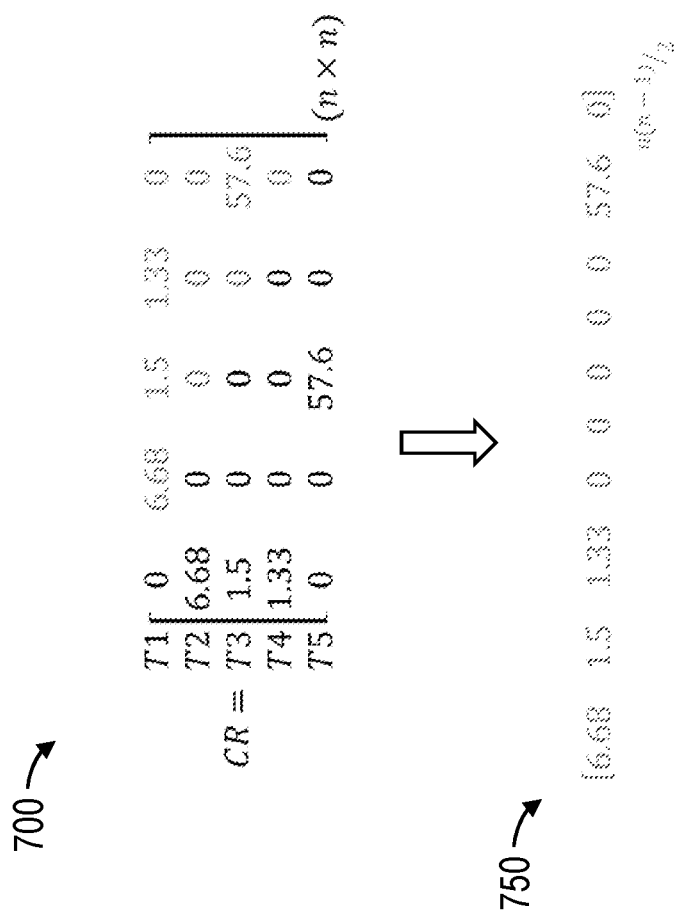
FIG. 7 depicts an example table of the ratio of cardinalities of the left and right tables of a join encoded in accordance with one or more embodiments.

The ratio of the size of the tables on the two sides of the join is another piece of information that can be a significant contributor to the resulted cardinality. In some embodiments, this information is computed and collected at compile time based on the statistics available in the optimizer. The computed ratios are encoded using the adjacency matrix $CR_{n \times n}$, which is then condensed into a one-dimensional vector of size $$\frac{n(n-1)}{2}$$

as described previously, for example, if using a model that requires a one-dimensional vector. FIG. 7 depicts an example table 700 of the ratio of cardinalities of the left and right tables $(T_i, T_j)$ encoded using the adjacency matrix and the resultant one-dimensional vector 750.

Skewness of the Join Columns (SK)

The values in the join columns after applying the local predicates may show different levels of skewness. Joins over uniformly distributed join columns are expected to have a different impact on cardinality compared with joins over skewed columns. In some embodiments, a measure of skewness can be calculated for each join column after applying the local predicates to a sample of values from the original table. Alternatively, the skewness factor can be learned by a supervised learning model (e.g., the trained model 218 and/or another model). The 'Gini coefficient' is such a measure that can represent the skewness factor compacted in a single number between zero and one. Values closer to zero indicate full equality (uniformity) while values closer to one indicate full inequality or skewness.

In some embodiments, when at least one side of the join involves more than one column, the skewness factor can be computed for the combined values in the columns involved. Although this measure is shown to be effective in capturing skewness factor, other measures of skewness might be chosen for encoding the pattern. The two values corresponding to the skewness of the join columns on each side of the join are encoded into an adjacency matrix $SK_{n \times n \times 2}$ which is then condensed into a one-dimensional vector of size n(n−1) as discussed previously. FIG. 8 depicts an example table 800 of the skewness factor (i.e., the selectivity of the most frequent values) on join columns $(T_i \cdot A, T_j \cdot A)$ encoded using the adjacency matrix and, if needed for input to the model, the resultant one-dimensional vector 850.

Join Factor (JF)

Some behavior profiles of the join (e.g., existence of overloaded dimensions where there are a very large number of dimension column values versus very few fact column values, expansion with many to many joins, etc.) can be captured by computing the join predicate selectivity from samples of the tables involved. This can be referred to as the join factor. In some embodiments, the join factor can be computed in three steps. First, compute the result of the Join from the samples (this is "C1"). Next, compute the cartesian product based on the sample cardinality of both sides of the join (this is "C2"). Finally, compute the composite join factor as C1/C2.

In some embodiments, join factor information is captured offline and stored as a part of the database statistics for the join predicate. When a given join has multiple join predicates, join factors can be captured for each join predicate separately. In some embodiments, the minimum, average, and maximum join factors per join are computed. In some embodiments, therefore, each join will have three values for the join factor that can be captured in a three-dimensional adjacency matrix $JF_{n \times n \times 3}$, which is then condensed into a one-dimensional vector of size $$\frac{3n(n-1)}{2}$$

if needed, as discussed previously. A separate example table for the join factor is omitted for convenience (refer to FIG. 8 for an example table and one-dimensional vector, but consider that each position will have three elements).

Inclusion Factor (IF)

Whether the one side of the join is a superset of the other side is a contributing factor in estimating the resulting join cardinality. In some embodiments, the join cardinality estimation module 150 captures this information, termed the inclusion factor. In some embodiments, the inclusion factor can be determined in four steps. First, from the samples, capture the number of distinct values of the join columns from either side of the join. Next, compute the number of values that match between the two sets. Then compute the size of the cartesian product of the two sets. Finally, compute the ratio of the number of matching values by the size of the cartesian product to get the inclusion factor.

In some embodiments, the inclusion factor information is captured offline and stored as a part of the database statistics for the join predicate. When a given join has multiple join predicates, inclusion factors can be captured for each join predicate separately. In some embodiments, the minimum, average, and maximum inclusion factor per join can be computed. Therefore, each join will have three values for the inclusion factor that can be captured in a three-dimensional adjacency matrix $IF_{n \times n \times 3}$, which is then condensed into a one-dimensional vector of size $$\frac{3n(n-1)}{2}$$

if needed, as discussed previously. A separate example table for the inclusion factor is omitted for convenience (refer to FIG. 8 for an example table and one-dimensional vector, but consider that each position will have three elements).

Node Coordinates (NC)

Base Table Cardinalities and Local Predicate Selectivities

In some embodiments, other characteristics of the query that are properties of the tables rather than the joins can be encoded as the node coordinates. These characteristics include the cardinality of the base tables as well as the selectivity of local predicates on the base tables. In some embodiments, this information is leveraged in predicting the resulted cardinality of the join query.

Figure 9:
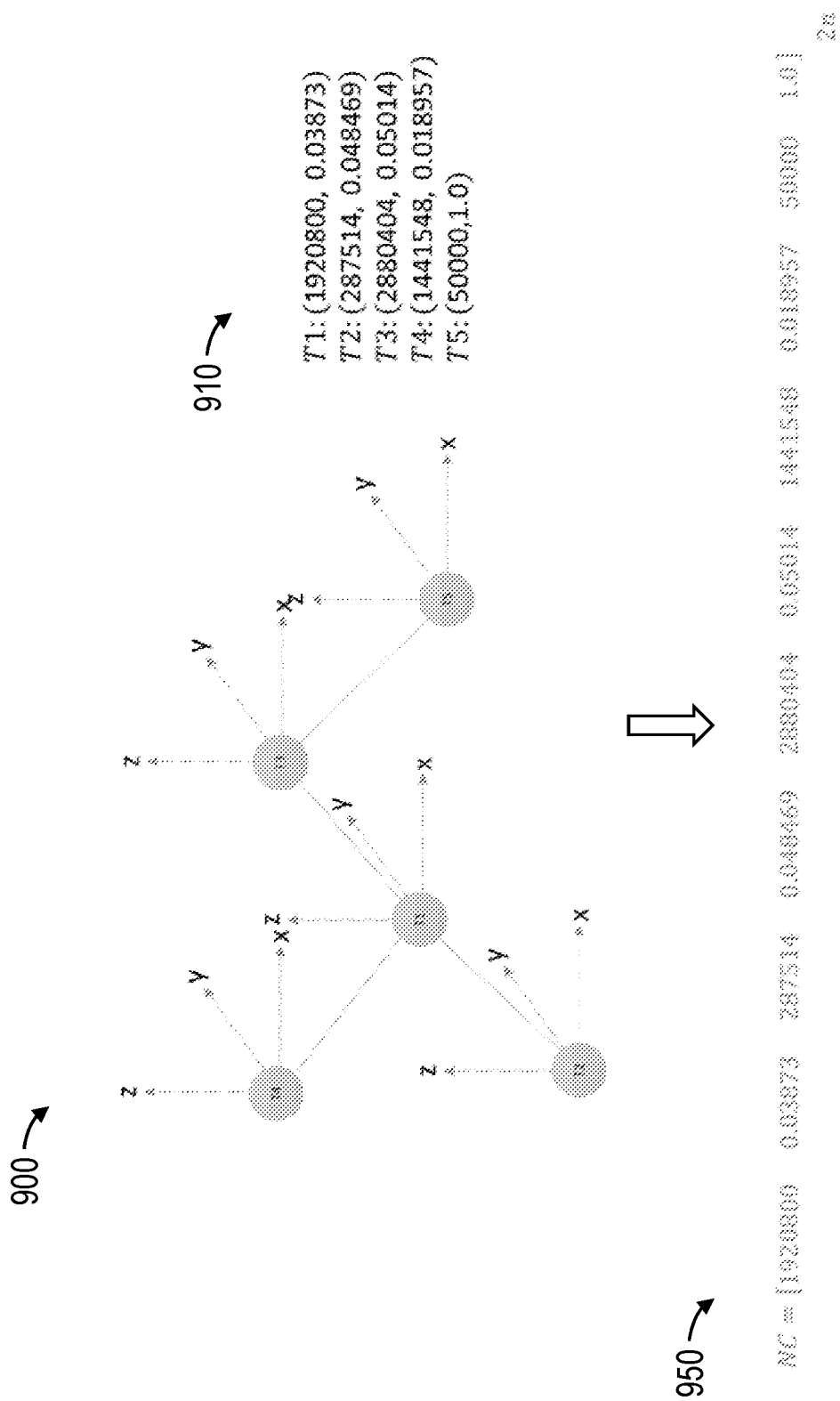
FIG. 9 depicts an example node coordinate encoding of the table properties of a join and the resultant one-dimensional vector in accordance with one or more embodiments.

Table cardinality can be obtained from statistics that are typically available in a relational database management system (RDBMS). The selectivity of the local predicates can be estimated either by applying the local predicates on samples of the base tables, or by any other means used in the optimizer to estimate the selectivity of the local predicates, such as histograms or selectivity models. FIG. 9 depicts an example node coordinate encoding 900 of the table properties and the resultant one-dimensional vector 950. As shown in FIG. 9, the node coordinates 910 can be represented as tuples (a,b) where a denotes the base table cardinality before applying the local predicates and b denotes the base table cardinality after applying the local predicates. The node coordinates 910 can be condensed into a one-dimensional vector of size $2n$, if needed, as discussed previously.

Local Predicate Correlations

Observe that, when multiple local predicates are applied on a given table, if the composite selectivity is estimated by a model, the correlations between the predicate columns are implicitly captured by the model. But if accurate composite selectivity estimates are not available, the pairwise correlations can be captured explicitly as a part of the encoding in some embodiments. These correlation factors can be captured offline and stored as a part of the database statistics. In the presence of multiple predicates, all pairwise correlations are loaded from the statistics and aggregated by taking minimum, average, and maximum correlations. In some embodiments, these three features are captured as additional node coordinates of the join graph representation.

Join Graph Encoding

In some embodiments, the above pieces (e.g., the Join Types (JT), the Join Operators (JO), the Ratio of Join Column(s) Cardinality to Table Cardinality (CC), the Ratio of Table Cardinalities (RC), the Skewness of the Join Columns (SK), the Join Factor (JF), the Inclusion Factor (IF), and the Node Coordinates (NC)) can be computed and collected in parallel to reduce the compilation overhead. In some embodiments, the computation can be computed once per query compilation for the entire join graph since it is independent of the plan choices and transformations evaluated by a production query optimizer during the process of searching for an optimal query execution plan.

In some embodiments, once the different pieces of the encoding (e.g., JT, JO, CC, CR, SK, JF, IF, and NC) are prepared as one-dimensional vectors, they can be concatenated together to form a final encoding for the query:

Encoding=JT∥JO∥CC∥CR∥SK∥JF∥IF∥NC

Other Applications

While the join graph representation is proposed here for building the join cardinality model, it is not limited to this application in any way. This representation can be used for any model which requires information about the query as input. For example, it can be used for a join planning model where the best join order or the best execution plan must be predicted for a given query.

Preprocessing Labels

The cardinality labels can have a wide range of values and typically exhibit large skewness. Therefore, log transformation is applied to the labels to reduce skewness and make them more suitable targets for a machine learning model to learn. This is performed with the following formula, where label_log represents the transformed label.

$$label_{log} = \log_{10}(cardinality)$$

The log transformed labels have a closer to normal distribution. But the range of values they take is still not suitable for deep learning models that are best at predicting values between zero and one. Therefore, the logarithmic labels are transformed using min-max scaling according to the following equation:

$$\text{label}_{scaled} = \frac{\text{label}_{log} - \min(\text{label}_{log})}{\max(\text{label}_{log}) - \min(\text{label}_{log})}$$

The $\min(\text{label}_{log})$ and $\max(\text{label}_{log})$ can obtained from the labels in the training data and stored for future invocations of the model.

Preprocessing Inputs

The input values of the encoded queries are also transformed using min-max scaling, so all input values take a range between zero and one. This is essential to help the machine learning model to converge more quickly. This is done by the following equation:

$$\text{Input}_{scaled} = \frac{\text{Input} - \min(\text{Input})}{\max(\text{Input}) - \min(\text{Input})}$$

Here, min(Input) and max(Input) are arrays that store the minimum and maximum values for all features in the input training data. In some embodiments, these arrays are collected and stored for future invocations of the model.

Multiple Specialized Models

While a single model can effectively learn to predict the cardinality of different classes of queries, it is also possible to train multiple models each specialized in a certain class. The query class is determined by the patterns that it exhibits, such as query graph patterns (linear, star, cyclic, etc.), presence of multiple predicates per join, presence of self-joins, etc. Each class of queries can exhibit different behaviors and show a different distribution of resulted cardinalities. Each model can therefore specialize to predict cardinality of a certain class. The specialized models can make more accurate predictions at the expense of relatively higher training overheads. The overhead can be tolerated in most environments given the model training phase is done offline and is not in the critical path of query execution.

Model Architecture, Tuning, and Validation

Depending on the complexity of the workload and the size of the training data set, neural networks with various architectures may provide optimal performance. This includes various combinations of number of hidden layers (network depth), number of neurons in each layer (network width), the activation functions of the hidden layers and the output layer. Various objective functions can be used to train models. Mean Squared Error is an effective objective function for this use-case.

While parameters that are found to be effective at development phase are supplied as default configurations, these values can also be tuned automatically at the customer site to be tailored to their specific workload characteristics. This can be done by performing a grid search in the combination of parameters, to find the combination with the least value of the objective function on the validation set. In addition, an early stopping technique is used to avoid overfitting.

Model Evaluation

The accuracy of the model(s) is measured using q-error which is the de-facto standard to measure accuracy of the cardinality estimation. q-error is computed as follows:

$$qError = \max\left(\frac{\text{prediction}}{\text{actual}}, \frac{\text{actual}}{\text{prediction}}\right)$$

Each model's accuracy can be measured and compared on the validation set and the ones that exceed a certain threshold be activated to be used. If not meeting the threshold criteria, the results are analyzed to determine what class of queries are impacted by suboptimal performance. This will lead to a targeted query generation that augments the training data with more queries from those classes. In some embodiments, the model training process will be repeated until the performance criteria is met.

Inputs for Inferencing

At inference time (e.g., during inference 204), information required for encoding can be obtained from various sources. The size of the tables, columns, and column groups can be collected either via the statistics typically available in the RDBMS or via an external and/or internal module (e.g., the join cardinality estimation module 150) that periodically monitors and captures the statistics. The selectivity of the local predicates can be obtained either from the estimation methods that are available in the optimizer, such as selectivity models or histograms, or from applying the local predicates to samples of the tables or from a feedback warehouse that is maintained based on actual run times. The same applies to computing or estimating the skewness of the join column as described previously.

In some embodiments, input preprocessing is done based on the min(Input) and max(Input) arrays that are collected and stored in the training phase as described previously.

Invoking the Model

Depending on which class the query belongs to, the preprocessed input data is fed to the corresponding model, and the target value is computed. The model is invoked during the query optimization phase of query compilation, during which the optimizer will enumerate various permutations on join orders. For each of these join orders, the optimizer will invoke the model with the associated encoding for that join order. The optimizer can enumerate different permutations of join orders for the same set (or subset) of joins, but the resulting cardinality for each join order is the same. To minimize any overhead of repeatedly constructing the input encoding and/or invoking the model, prediction results can be computed once for each join combination and cached for later re-use.

Inverse Transformation of the Predictions

Since the model predicts the transformed version of the cardinality value, it must be reverse transformed before it can be used in the optimizer. This reverse transformation includes two steps: inverse min-max scaling, and inverse log transformation as follows:

$$modelOutput_{log} = (modelOutput(\max(\text{Input}) - \min(\text{Input}))) +$$
$$\min(\text{Input}) \; predictedCardinality = 10^{modelOutput_{log}}$$

Continuous Learning from Runtime Feedback

In some embodiments, the model's performance is continuously measured and monitored for incoming queries. If the prediction accuracy does not meet the performance criteria, the corresponding query is analyzed and the classes that the query belongs to are identified. This leads to generating queries that exhibit the same patterns. The new queries are encoded and added to the training data and used for training future models. Runtime feedback could also help with more accurate information that is encoded to get better predictions from an existing model.

Alternative Approach for Handling Various Join Types

Alternatively, or in addition, the join cardinality model described previously herein can be trained with queries including only inner-joins. The predictions from such a model can be used to make estimates for other types of joins. This means in the representation that the Join Type encoding described previously will be excluded (since all joins will be inner-joins by default).

In some embodiments, computing cardinalities for left outer-joins (LOJ), right outer-join (ROJ), and full outer-join (FOJ) is performed as follows: First, LOJ=IJ+LAJ; next, ROJ=IJ+RAJ; finally, FOJ=IJ+LAJ+RAJ, where LAJ stands for left anti-join and RAJ stands for right anti-join.

The computation of anti-joins can be performed in multiple ways. The first method is to use the simplifying assumptions that some optimizers make today for computing such joins. The second method would require the model to predict multiple statistics for a given node. Specifically, the model will predict not only the cardinality of the inner-join but also the filter factor of the inner stream (inner_ff) and the filter factor of the outer stream (outer_ff). These two will allow for the estimation of LAJ and RAJ as follows: First, LAJ=(1−outer_ff)*cart_card; next, RAJ=(1−inner_ff)*cart_card, where cart_card represents the cardinality of the cartesian product of the inner and the outer streams. To make this simpler, the model can be designed to predict outer_ff only in some embodiments. A cardinality of a RAJ can then be estimated using the outer_ff by converting the RAJ to a LAJ in the input. The third method is to have an anti-join model at least for pairwise base tables with suitable local predicates.

Limiting the model to only inner-joins has two main benefits: the size of the encoding and therefore the model complexity will be reduced resulting in better accuracy and generalization, and model training becomes relatively cheaper as relatively fewer data points will be required. While such an approach is expected to give better estimates for inner-joins, its accuracy for outer-joins and anti-joins relies on decent estimates for inner_ff and outer_ff. Whether to train the model by including all join types or with the inner-joins only can be determined on a case-by-case basis depending on how the two approaches compare for a given database.

Performance Results and Prior Model Comparisons

The join cardinality estimation architecture described herein (leveraging a join graph representation) builds on prior approaches to join cardinality estimation, such as, for example, the so-called query graph representation. Advantageously, the present architecture can generalize to unseen joins and can further generalize and extrapolate to more joins (e.g., from 1 to 4 seen joins, extrapolating to 5 or more unseen joins).

The join cardinality estimation architecture described herein, when trained on combinations of 4 joins, have been found to extrapolate to 14 joins with minimal error (specifically a log prediction/actual rate of less than 7.5), far exceeding prior results. The present model can outperform prior solutions for estimating join cardinality since the model described herein specializes for joins specifically, reducing the time to train, reducing the model size, and reducing the error of the join cardinality estimates. Furthermore, this solution can work together with prior query graph representation-based approaches, where the prior architectures can be used for non-join portions of the query graph while models built according to one or more embodiments described herein can be used capture the joins, as well as to provide the inputs to the prior models to represent the joins as derived results input to those models.

In summary, the join cardinality estimation architecture described herein offers an efficient model that is trained using relatively smaller encodings (as compared to prior architectures that are not join cardinality-specific models), resulting in a compact model with fewer parameters. Therefore, the size of the model can be much smaller, leading to faster inferencing (i.e. making predictions). Moreover, as training time is proportional to the size of the encoding and to the complexity of the model (model parameters), the smaller encoding afforded to models built as described herein, combined with a simpler model, directly translates to a training regime that is significantly (orders of magnitude) faster.

Figure 10:
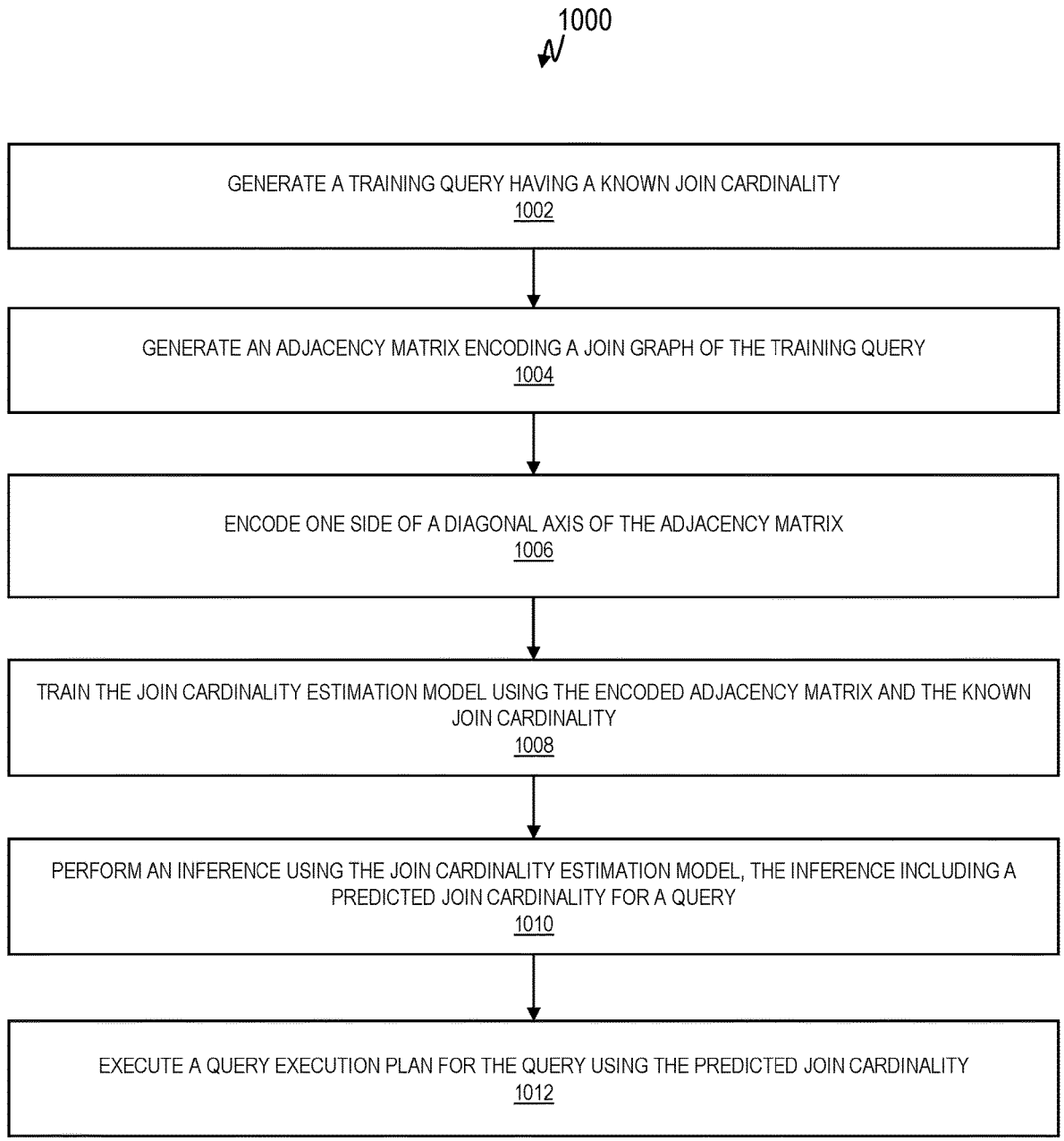
FIG. 10 is a flowchart in accordance with one or more embodiments of the present invention.

Referring now to FIG. 10, a flowchart 1000 for providing a learned join cardinality estimation using a join graph representation is generally shown according to an embodiment. The flowchart 1000 is described in reference to FIGS. 1-9 and may include additional blocks not depicted in FIG. 10. Although depicted in a particular order, the blocks depicted in FIG. 10 can be rearranged, subdivided, and/or combined. In exemplary embodiments, the method 1000 can be performed by a computing environment (e.g., computing environment 100 shown in FIG. 1).

The method includes steps for building a join cardinality estimation model. At block 1002, the method includes generating a training query having a known join cardinality. At block 1004, the method includes generating an adjacency matrix encoding a join graph of the training query. At block 1006, the method includes condensing the adjacency matrix into a one-dimensional vector encoding one side of a diagonal axis of the adjacency matrix. At block 1008, the method includes training the join cardinality estimation model using the one-dimensional vector, if appropriate for the model, and the known join cardinality.

At block 1010, the method includes performing an inference using the join cardinality estimation model. The inference includes a predicted join cardinality for a query.

At block 1012, the method includes executing a query execution plan for the query using the predicted join cardinality.

Figure 11:
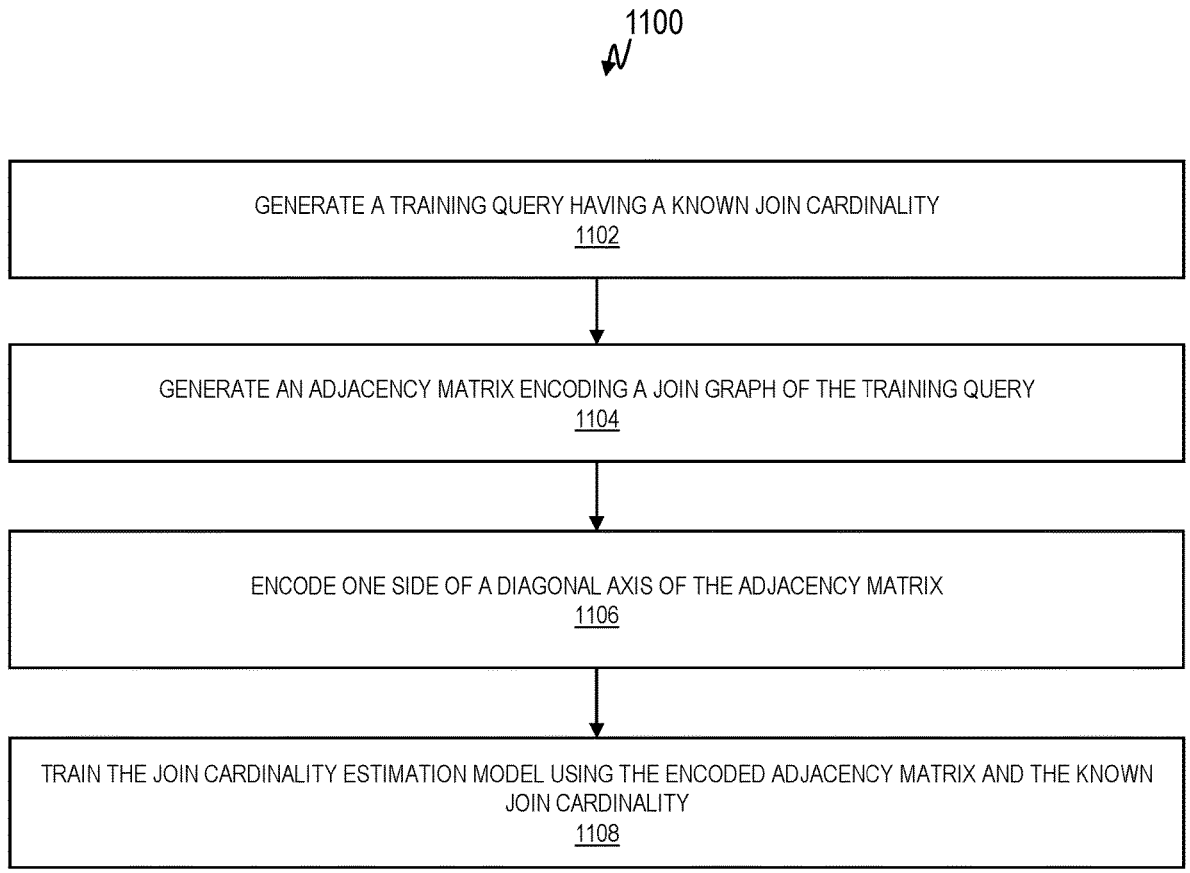
FIG. 11 is a flowchart in accordance with one or more embodiments of the present invention.

Referring now to FIG. 11, a flowchart 1100 for training a join cardinality estimation model is generally shown according to an embodiment. The flowchart 1100 is described in reference to FIGS. 1-9 and may include additional blocks not depicted in FIG. 11. Although depicted in a particular order, the blocks depicted in FIG. 11 can be rearranged, subdivided, and/or combined. In exemplary embodiments, the method 1100 can be performed by a computing environment (e.g., computing environment 100 shown in FIG. 1).

At block 1102, the method includes generating a training query having a known join cardinality. At block 1104, the method includes generating an adjacency matrix encoding a join graph of the training query. At block 1106, the method includes condensing the adjacency matrix into a one-dimensional vector encoding one side of a diagonal axis of the adjacency matrix. At block 1108, the method includes training the join cardinality estimation model using the one-dimensional vector, if appropriate for the model, and the known join cardinality.

Figure 12:
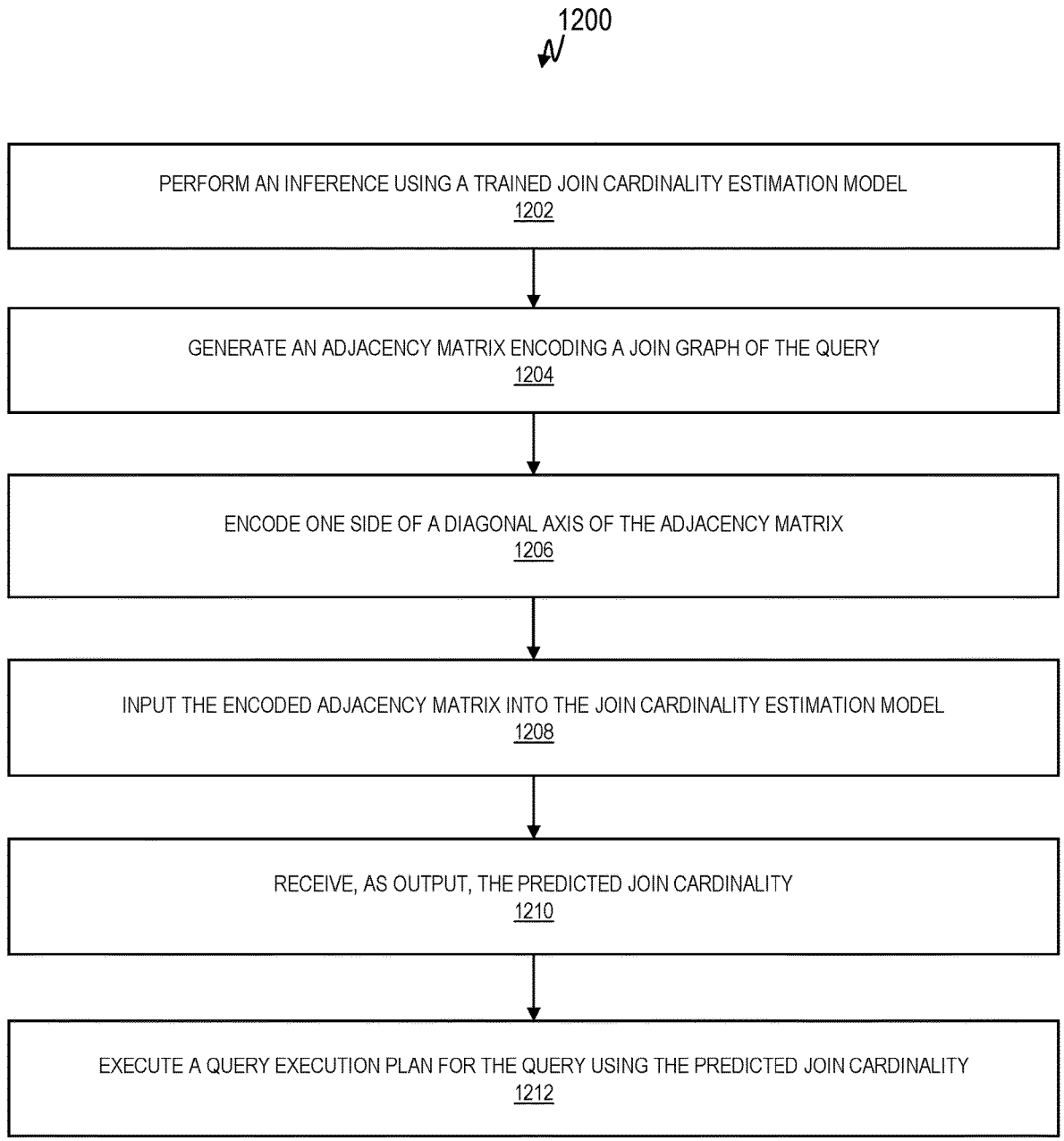
FIG. 12 is a flowchart in accordance with one or more embodiments of the present invention.

Referring now to FIG. 12, a flowchart 1200 for leveraging a join cardinality estimation model for inferencing is generally shown according to an embodiment. The flowchart 1200 is described in reference to FIGS. 1-9 and may include additional blocks not depicted in FIG. 12. Although depicted in a particular order, the blocks depicted in FIG. 12 can be rearranged, subdivided, and/or combined. In exemplary embodiments, the method 1200 can be performed by a computing environment (e.g., computing environment 100 shown in FIG. 1).

At block 1202, the method includes performing an inference using a trained join cardinality estimation model. The inference includes a predicted join cardinality for a query.

At block 1204, the method includes generating an adjacency matrix encoding a join graph of the query. At block 1206, the method includes condensing the adjacency matrix into a one-dimensional vector, if appropriate for the model, encoding one side of a diagonal axis of the adjacency matrix. At block 1208, the method includes inputting the encoded join graph into the join cardinality estimation model. At block 1210, the method includes receiving, as output, the predicted join cardinality.

At block 1212, the method includes executing a query execution plan for the query using the predicted join cardinality.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   building a join cardinality estimation model by:
   generating a training query having a known join cardinality;
   generating an adjacency matrix encoding a join graph of the training query, wherein, for a given query that joins a set of n tables, the respective adjacency matrix can be defined as an n×n matrix, where a value in the matrix at a position (i, j) is 1 if the table i is joined with table j and 0 otherwise;
   encoding one side of a diagonal axis of the adjacency matrix; and
   training the join cardinality estimation model using the encoded adjacency matrix and the known join cardinality;
   performing an inference using the join cardinality estimation model, the inference comprising a predicted join cardinality for a query; and
   executing a query execution plan for the query using the predicted join cardinality.

2. The computer-implemented method of claim 1, wherein performing the inference comprises:
   generating an adjacency matrix encoding a join graph of the query;

encoding one side of a diagonal axis of the adjacency matrix;

inputting the encoded adjacency matrix into the join cardinality estimation model; and receiving, as output, the predicted join cardinality.

3. The computer-implemented method of claim 1, wherein encoding the adjacency matrix includes condensing the adjacency matrix to a one dimensional vector for machine learning algorithms requiring a vector input.

4. The computer-implemented method of claim 1, wherein building the join cardinality estimation model further comprises:

generating an additional adjacency matrix encoding a join type of the training query;

encoding one side of a diagonal axis of the additional adjacency matrix into a join type adjacency matrix; and concatenating the encoded join type adjacency matrix with the encoded join graph prior to training the join cardinality estimation model.

5. The computer-implemented method of claim 1, wherein building the join cardinality estimation model further comprises:

generating an additional adjacency matrix encoding a join operator of the training query;

encoding one side of a diagonal axis of the additional adjacency matrix into a join operator adjacency matrix; and concatenating the encoded join operator adjacency matrix with the encoded join graph prior to training the join cardinality estimation model.

6. The computer-implemented method of claim 1, wherein building the join cardinality estimation model further comprises:

generating an additional adjacency matrix encoding a ratio of the cardinality of join columns to table cardinality on each side of a join of the training query;

encoding one side of a diagonal axis of the additional adjacency matrix into a column-to-table adjacency matrix; and concatenating the encoded column-to-table adjacency matrix with the encoded join graph prior to training the join cardinality estimation model.

7. The computer-implemented method of claim 1, wherein building the join cardinality estimation model further comprises:

generating an additional adjacency matrix encoding a ratio of the cardinality of left and right tables of a join of the training query;

encoding one side of a diagonal axis of the additional adjacency matrix into a table cardinalities adjacency matrix; and concatenating the encoded table cardinalities adjacency matrix with the encoded join graph prior to training the join cardinality estimation model.

8. The computer-implemented method of claim 1, wherein building the join cardinality estimation model further comprises:

generating an additional adjacency matrix encoding a measure of skewness for each join column of a join of the training query;

encoding one side of a diagonal axis of the additional adjacency matrix into a skewness adjacency matrix; and concatenating the encoded skewness adjacency matrix with the encoded join graph prior to training the join cardinality estimation model.

9. The computer-implemented method of claim 1, wherein building the join cardinality estimation model further comprises:

generating an additional adjacency matrix encoding a measure of a join selectivity of a join without local predicates of the training query;

encoding one side of a diagonal axis of the additional adjacency matrix into a join factor adjacency matrix; and concatenating the encoded join factor adjacency matrix with the encoded join graph prior to training the join cardinality estimation model.

10. The computer-implemented method of claim 1, wherein building the join cardinality estimation model further comprises:

generating an additional adjacency matrix encoding an inclusion measure of one side of a join column values in the other side of the join column values of the training query;

encoding one side of a diagonal axis of the additional adjacency matrix into an inclusion factor adjacency matrix; and concatenating the encoded inclusion factor adjacency matrix with the encoded join graph prior to training the join cardinality estimation model.

11. The computer-implemented method of claim 1, wherein building the join cardinality estimation model further comprises:

generating an additional adjacency matrix encoding a cardinality of respective base tables and a selectivity of local predicates on the base tables of a join of the training query;

encoding one side of a diagonal axis of the additional adjacency matrix into a node coordinates adjacency matrix; and concatenating the encoded node coordinates adjacency matrix with the encoded join graph prior to training the join cardinality estimation model.

12. A system having a memory, computer readable instructions, and one or more processors for executing the computer readable instructions, the computer readable instructions controlling the one or more processors to perform operations comprising:

building a join cardinality estimation model by:
generating a training query having a known join cardinality;

generating an adjacency matrix encoding a join graph of the training query, wherein, for a given query that joins a set of n tables, the respective adjacency matrix can be defined as an n×n matrix, where a value in the matrix at a position (i, i) is 1 if the table i is joined with table j and 0 otherwise;

encoding one side of a diagonal axis of the adjacency matrix; and training the join cardinality estimation model using the encoded adjacency matrix and the known join cardinality;

performing an inference using the join cardinality estimation model, the inference comprising a predicted join cardinality for a query; and executing a query execution plan for the query using the predicted join cardinality.

13. The system of claim 12, wherein performing the inference comprises:

generating an adjacency matrix encoding a join graph of the query;

encoding one side of a diagonal axis of the adjacency matrix;

inputting the encoded adjacency matrix into the join cardinality estimation model; and receiving, as output, the predicted join cardinality.

14. The system of claim 12, wherein encoding the adjacency matrix includes condensing the adjacency matrix to a one dimensional vector for machine learning algorithms requiring a vector input.

15. The system of claim 12, wherein building the join cardinality estimation model further comprises:

generating an additional adjacency matrix encoding a join type of the training query;

encoding one side of a diagonal axis of the additional adjacency matrix into a join type adjacency matrix; and concatenating the encoded join type adjacency matrix with the encoded join graph prior to training the join cardinality estimation model.

16. A computer program product comprising a computer readable storage medium having program instructions embodied therewith, the program instructions executable by one or more processors to cause the one or more processors to perform operations comprising:

building a join cardinality estimation model by:

generating a training query having a known join cardinality;

generating an adjacency matrix encoding a join graph of the training query, wherein, for a given query that joins a set of n tables, the respective adjacency matrix can be defined as an n×n matrix, where a value in the matrix at a position (i, j) is 1 if the table i is joined with table j and 0 otherwise;

encoding one side of a diagonal axis of the adjacency matrix; and training the join cardinality estimation model using the encoded adjacency matrix and the known join cardinality;

performing an inference using the join cardinality estimation model, the inference comprising a predicted join cardinality for a query; and executing a query execution plan for the query using the predicted join cardinality.

17. The computer program product of claim 16, wherein performing the inference comprises:

generating an adjacency matrix encoding a join graph of the query;

encoding one side of a diagonal axis of the adjacency matrix;

inputting the encoded adjacency matrix into the join cardinality estimation model; and receiving, as output, the predicted join cardinality.

18. The computer program product of claim 16, wherein encoding the adjacency matrix includes condensing the adjacency matrix to a one dimensional vector for machine learning algorithms requiring a vector input.

19. The computer program product of claim 16, wherein building the join cardinality estimation model further comprises:

generating an additional adjacency matrix encoding a join type of the training query;

encoding one side of a diagonal axis of the additional adjacency matrix into a join type adjacency matrix; and concatenating the encoded join type adjacency matrix with the encoded join graph prior to training the join cardinality estimation model.

20. A computer-implemented method comprising:

generating a training query having a known join cardinality;

generating an adjacency matrix encoding a join graph of the training query, wherein, for a given query that joins a set of n tables, the respective adjacency matrix can be defined as an n×n matrix, where a value in the matrix at a position (i, j) is 1 if the table i is joined with table j and 0 otherwise;

encoding one side of a diagonal axis of the adjacency matrix; and training the join cardinality estimation model using the encoded adjacency matrix and the known join cardinality.

21. The computer-implemented method of claim 20, wherein encoding the adjacency matrix includes condensing the adjacency matrix to a one dimensional vector for machine learning algorithms requiring a vector input.

22. A computer-implemented method comprising:

performing an inference using a trained join cardinality estimation model, the inference comprising a predicted join cardinality for a query, wherein performing the inference comprises:

generating an adjacency matrix encoding a join graph of the query;

encoding one side of a diagonal axis of the adjacency matrix;

inputting the encoded adjacency matrix into the join cardinality estimation model; and receiving, as output, the predicted join cardinality; and executing a query execution plan for the query using the predicted join cardinality;

wherein, when the query joins a set of n tables, the adjacency matrix can be defined as an n×n matrix, where a value in the matrix at a position (i, j) is 1 if the table i is joined with table j and 0 otherwise.

* * * * *